United States Patent Office 2,833,355
Patented May 6, 1958

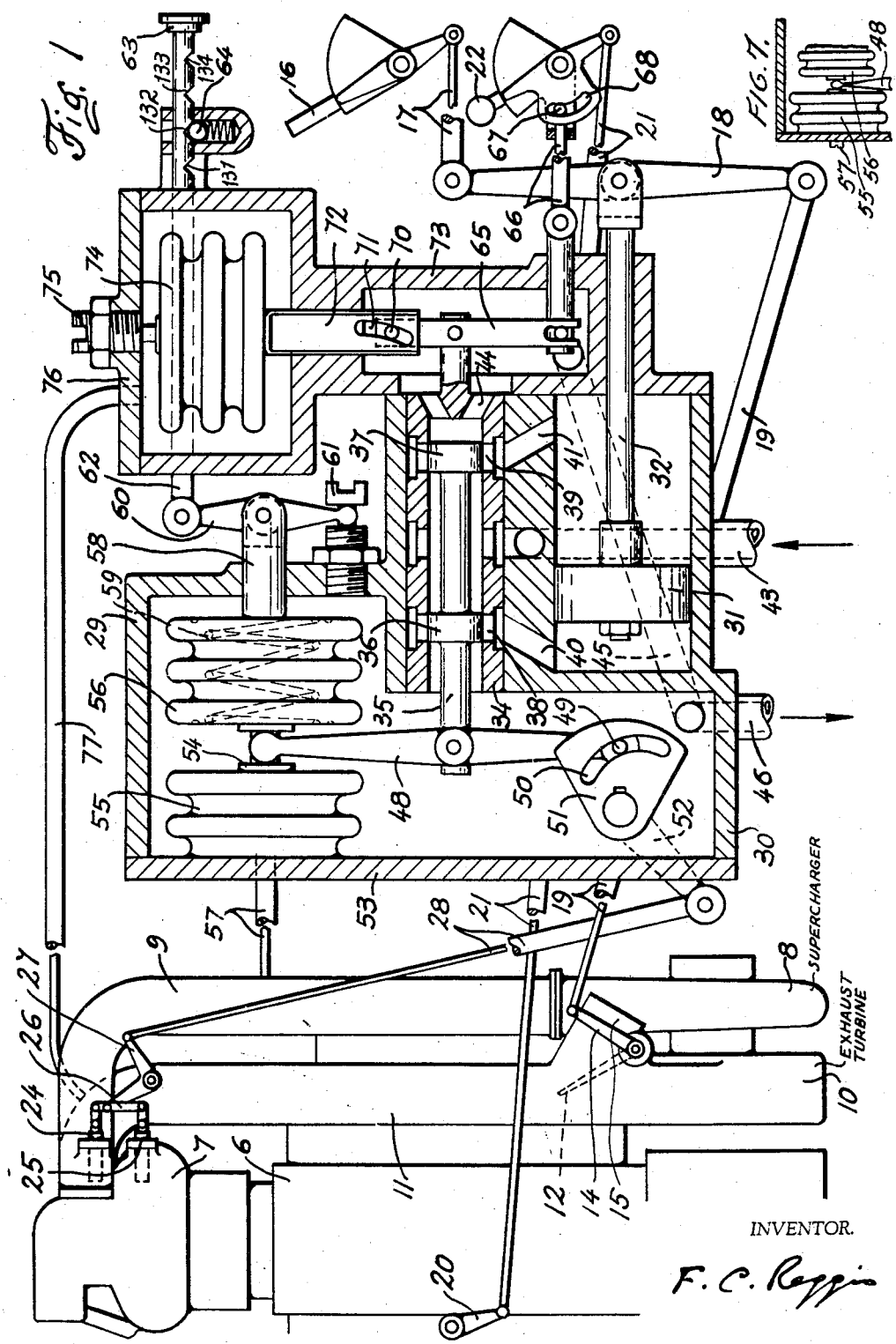

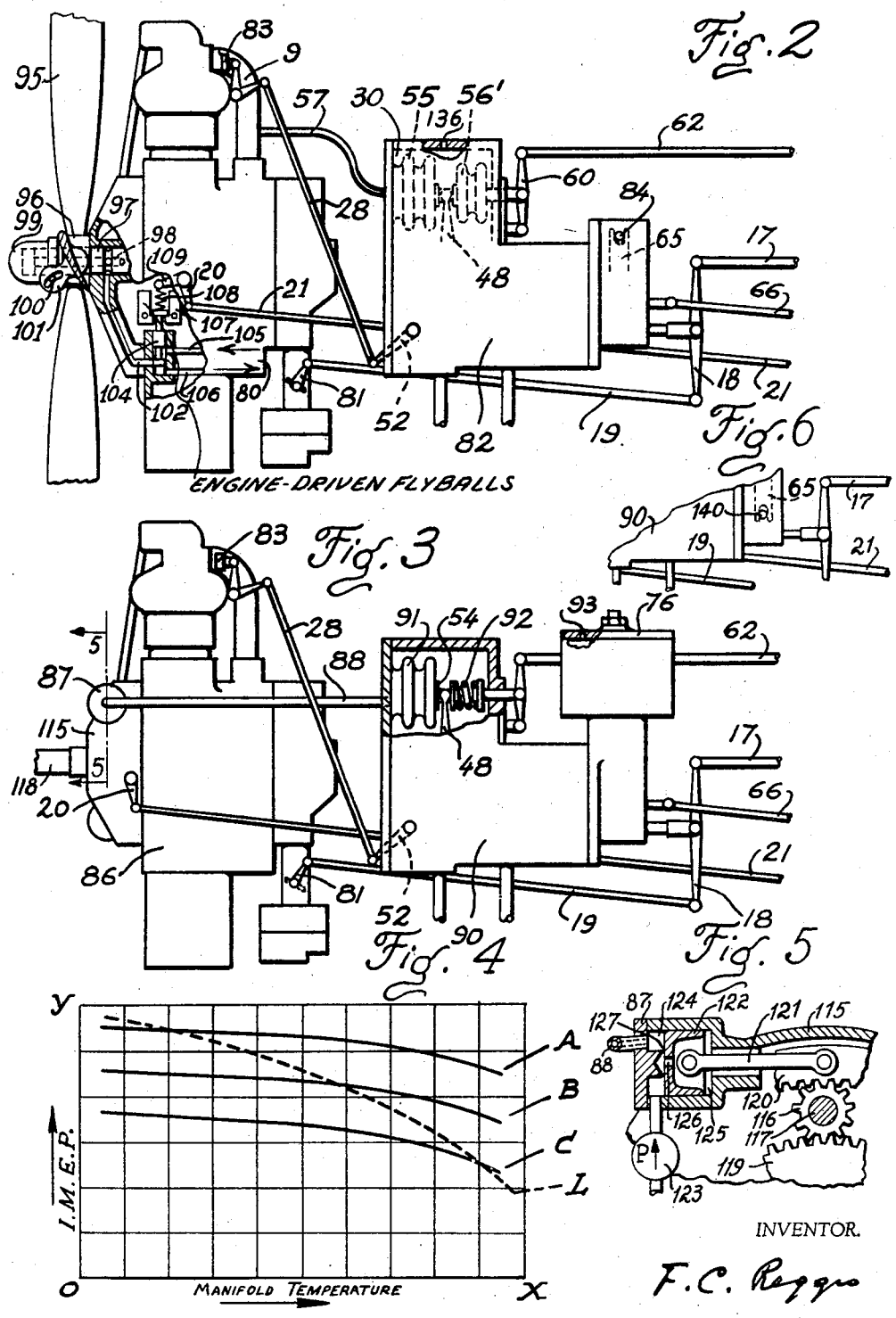

2,833,355

ENGINE CONTROL DEVICE

Ferdinando Carlo Reggio, Norwalk, Conn.

Original application December 15, 1941, Serial No. 423,001. Divided and this application August 8, 1951, Serial No. 240,860

21 Claims. (Cl. 170—135.74)

The present application is a division of my copending application Serial No. 423,001 filed December 15, 1941, now abandoned.

The invention relates to improvements in engine control or regulating devices and has particular reference to improved controls for automotive and aircraft engines.

An object of the invention is to provide a regulating device for automatically varying the engine power output substantially as a preselected function of one or more engine operative conditions or other variable conditions affecting the engine operation.

Another object is to provide a regulating device for automatically limiting the maximum engine output to a value depending on at least one variable condition affecting the engine operation such as an engine operating temperature.

Another object is to provide a device for controlling the engine power output by automatically varying the engine fuel supply, or the induction or manifold air pressure, or the engine torque in dependence upon preselected engine operative conditions and upon the adjustment of a manual control member.

An additional object is to provide an improved control for regulating the engine either directly from a manually adjustable control member or automatically in predetermined relation to preselected variables.

A further object is to provide an improved regulator for supercharged engines having a variable speed supercharger, such for example as a supercharger driven by an exhaust turbine, for controlling the supercharger in predetermined relation to preselected operating variables.

A further object is to provide a control for regulating the speed and torque or the speed and fuel flow of an engine automatically in preselected coordination.

Still another object is to provide an engine and propeller control for regulating the engine fuel flow and the propeller blade angle automatically to obtain preselected operational schedules.

A still further object is to provide an aircraft engine control for regulating fuel flow and propeller blade angle according to an approximate predetermined schedule with temperature and density compensation.

Still another object is to provide an engine control having condition selecting means for obtaining various preselected schedules of power and speed required for different operating conditions, and power selecting means.

Other objects and advantages will be more particularly pointed out hereinafter or will become apparent as the description proceeds.

The drawings, in which there are diagrammatically illustrated suitable constructional arrangements for the purpose of disclosing the invention, are for purpose of illustration only and are not to be taken as limiting or restricting the scope of the invention.

In the drawings:

Figure 1 is a sectional view of an engine regulator and includes in reduced scale a diagrammatic illustration of an aircraft engine and control instrumentation therefor.

Figures 2 and 3 are diagrammatic illustrations of partially modified constructions and arrangements of engine regulator.

Figure 4 is an example of engine calibration curve.

Figure 5 is a fragmentary section along the line 5—5 of Figure 3.

Figure 6 is a fragmentary modification of Figure 3.

Figure 7 is a fragmentary modification of Figure 1.

The characteristic power calibration curves of an aircraft engine, represented in Figure 4, are referred to the axes of abscissae OX and ordinates OY representing the engine manifold temperature and the indicated mean effective pressure respectively. The values of said temperature and pressure increase in the directions indicated by the arrows.

The four curves of Figure 4 represent the result of actual engine tests conducted with a specified fuel, at a given value of engine speed and exhaust pressure. The curve A represents the engine indicated mean effective pressure developed under a constant value of manifold pressure for different values of manifold temperature. The slope of this curve shows a decrease of indicated M. E. P. with increase in manifold temperature, which is due mainly to the corresponding reduction of density in the induction manifold. Curves B and C similarly show the indicated M. E. P. developed for two different lower constant values of manifold pressure. The dotted line L represents the upper limit for continuous operation, that is, the highest values of M. E. P. that can be safely developed by the engine under varying manifold temperature. It is apparent from the curve L that the maximum permissible value of the manifold pressure, and in turn the indicated M. E. P., diminishes as the manifold temperature increases.

In highly supercharged aircraft engines in which said temperature may vary within wide limits, engine regulators limiting the maximum engine torque or manifold pressure at a constant value have the disadvantage that they either limit the engine output at an unnecessarily low value under low manifold temperature, or overload the engine at elevated temperature, or both. Accordingly, one of the objects of the present invention is to provide a device for limiting the maximum engine output, or torque, or manifold pressure, or fuel flow, to a value varying substantially as a predetermined function of the manifold temperature.

Moreover, the upper safe limit for continuous operation varies upon changes of fuel characteristics and other engine operative conditions such as exhaust pressure, cylinder temperature, engine speed, surrounding atmospheric conditions. Thus a further object of the invention is to provide a regulator for varying the engine output, or the manifold pressure, or the engine torque, upon variation of one or more preselected variables such as the above.

While the curve L represents the upper safe limit for continuous operation, other similar curves may be determined corresponding to a maximum safe temporary engine overload, such as the upper limit for take-off power, which is also generally found to be dependent upon engine operative conditions such as manifold temperature, exhaust pressure, etc. Accordingly, still another object is to provide a regulating device as outlined above, including a control member for selectively limiting the maximum engine output either at a safe value for continuous operation, or at a higher temporary value also variable upon changes of preselected variables. Furthermore, the regulating device may be employed for automatically adjusting the engine torque, or output, or the manifold pressure, at values lower than those corresponding to the upper limit for continuous operation, as will be apparent from the following description.

One form of the invention is illustrated in Figure 1 in combination with an engine such as an aircraft radial spark-ignition engine, although the invention is in no way limited in its application to any particular form or type of engine. Such engine 6 has cylinders 7 receiving air or combustible mixture from a blower or compressor or supercharger 8 by way of pipes or manifold 9 forming part of the engine induction system. The supercharger 8 is driven at variable speed by an exhaust turbine 10 connected by exhaust pipe 11 to the cylinder exhaust ports. The flow of exhaust gases to the turbine nozzles is regulated by a valve or waste gate 12. When the latter is rotated clockwise by means of an actuating lever 14 all exhaust gases from the engine will be delivered to the turbine, causing high speed operation thereof. On the other hand, when the valve 12 is rotated counter-clockwise, the exhaust gases are discharged through the duct 15 and the turbine becomes inoperative. At intermediate positions of the valve 12, more or less exhaust gases will be supplied to the turbine, and the speed thereof will assume corresponding intermediate values. A control member 16 is connected with lever 14 by way of rod 17, lever 18 and rod 19 and may be employed directly to control the adjustment of the valve 12 and in turn the speed of the supercharger 8 and the pressure of the air or the combustible mixture delivered to the engine cylinders by way of conduit or manifold 9, hereinafter referred to as manifold pressure, or supercharged fluid pressure.

The engine 6 drives a variable pitch propeller provided with a servomotor such as a hydraulic or electric motor controlled by an engine driven speed governor adjustable by means of lever 20, rod 21 and control member 22, for controlling the propeller pitch or blade angle thereof automatically to keep the engine speed constant at a value determined by the adjustment of the control member 22. In the arrangement diagrammatically indicated in Figure 2 each of the propeller blades 95 is rotatable about a spider arm 96 attached to the propeller shaft 97. The latter has an internal chamber 98 closed by a cap 99 axially slidable on the shaft 97 under hydraulic pressure supplied to the chamber 98 by way of the pipe 102. The cap 99 has studs 100 which engage slots in lugs 101 carried by the blades 95. When the propeller is in operation centrifugal and aerodynamic forces tend to turn the blades 95 into maximum pitch against hydraulic pressure.

A piston valve 104 controls the admission of lubricating oil under pressure from a source, not shown, through pipes 105 and 102 to the chamber 98 and the discharge of oil from the latter through pipe 102 and an oil return pipe 106 back to the engine. The piston valve 104 is actuated by the centrifugal force of the engine driven flyballs 107 acting against the load of spring 108 whose load is variably adjusted by means of lever 109 keyed to the shaft of lever 20.

Under steady flying conditions the flyballs 107 are held in equilibrium by the load of the spring 108 acting against the centrifugal force, variations in engine speed causing adjustment of the valve 104 and thus effecting changes of propeller pitch, or blade angle, tending to maintain the engine speed substantially constant at a value corresponding to the adjustment of the governor spring 108. The speed at which the governor will automatically maintain the engine may be changed by varying the angular setting of the pilot's control lever 22 connected with lever 20, thereby altering the load of the governor spring 108.

Two temperature responsive elements 24 and 25, the former connected to the manifold 9 and responsive to the temperature of the air or combustible mixture therein, hereinafter referred to also as manifold temperature or supercharged fluid temperature, and the latter responsive to the temperature of the engine cylinder or suitable part associated therewith, or to the coolant temperature in a liquid cooled engine, are connected by way of rods to the ends of lever 26 rotatably carried at an intermediate point thereof by a bell-crank lever 27 for actuating a link or rod 28. An increase of temperature of either element rotates lever 27 clockwise.

The engine regulating device, generally indicated at 29, may conveniently comprise a casing 30 having two parallel cylindrical chambers therein. Within one of said chambers there is disposed a reciprocable piston 31 attached to a rod 32 rotatably connected with a lever 18 at an intermediate point thereof. In the other cylinder there are mounted valve elements such as a reciprocable sleeve 34 provided with an axial cylindrical bore within which there is slidably mounted a plunger valve 35 having two spaced cylindrical discs 36 and 37 for controlling ports 38 and 39 which are formed in the sleeve 34 and are so arranged as to be in permanent flow communication, by way of annular grooves formed in the sleeve 34 and ducts 40 and 41, with the cylinder chambers on either side of piston 31, respectively.

The annular chamber between discs 36 and 37 within the sleeve valve 34 is connected by way of suitable ports and line 43 with a source of pressure fluid, such as oil from the engine pressure lubricating system, while the two portions of the sleeve bore external to the discs 36 and 37 are intercommunicating by way of conduits 44 and 45, and are maintained at relatively low pressure through the return line 46 leading oil back to a reservoir or oil sump. The above outlined hydraulic servomotor is a known device, and it will be readily understood that with the valve elements in relative neutral adjustment, with ports 38 and 39 closed as shown in Figure 1, the piston 31 is maintained stationary. Either a displacement toward the right of the plunger valve 35 or a movement to the left of the sleeve 34 causes the cylinder chamber on the left side of the piston 31 to be connected with the oil return line 46, while oil under pressure is admitted to the opposite side of the piston, thus displacing the latter to the left and determining clockwise rotation of lever 18 about its upper connection, and counter-clockwise rotation of valve 12. Opposite rotation of the latter is obviously determined by displacement of the plunger valve 35 toward the left or by movement of the sleeve 34 to the right.

The left end of the plunger valve 35 is connected with a lever 48 at an intermediate point thereof, while the lower end of said lever is provided with a pin 49 cooperating with a slot 50 formed in a disc 51 keyed on the shaft carrying the lever 52, which is connected with the rod 28 actuated by the bell crank lever 27. Thus the adjustment of the lower end of the lever 48 varies as a function of the temperature of the elements 24 and 25, said function depending upon the configuration of the slot 50. The upper end of the lever 48 is actuated by a member 54 secured to the movable walls of two diaphragm chambers or bellows 55 and 56. The former bellows is secured to the cover 53 of the housing 30, and the pressure within said bellows is kept by way of pipe 57 at the same value as in the engine induction system or manifold 9, while bellows 56, provided with a calibrated spring 59 tending to expand it, is positioned by a member 58 slidably mounted in the wall of the housing 30. A lever 60, rotatably carried at an intermediate point thereof by member 58, is connected at its lower and upper ends with an adjusting member 61 and, by means of rod 62, with a manually adjustable member 63, respectively.

The adjustment of the upper end of lever 48 is thus dependent on the adjustment of member 63 and the engine manifold pressure. If the areas of bellows 55 and 56 are equal, changes of pressure within the housing 30 do not affect the adjustment of the lever 48, the latter being thus responsive to the absolute manifold pressure. If one of the bellows has larger area than the other, as shown for instance in Figure 7, then an increase of pressure within the housing 30 will tend to contract said larger bellows, thus displacing the lever 48. Furthermore, if bellows 56 is not highly evacuated, but contains a substantial mass of expansible fluid, then the adjustment of the lever 48 will also be affected by changes of temperature within the housing 30.

The control member 63 may be provided with notches cooperating with a resiliently loaded detent 64. Four notches, 131 to 134, are indicated in Figure 1.

The sleeve 34 is actuated by a lever 65, which is connected at one end thereof with a rod 66 terminating in a pin 67 cooperating with a slot 68 formed in the pilot's control member 22, whereby the adjustment of the sleeve 34 is dependent on the setting of the control lever 22 and therefore on the engine speed. The other end of lever 65 carries a pin 70 cooperating with a slot 71 formed in a rod 72 slidably mounted in a bore of the housing 73 and connected with an evacuated, resiliently loaded bellows 74 supported by an adjustable member 75 carried by the housing cover 76 which closes the bellows chamber. The latter is maintained at exhaust pressure by means of a pipe 77 connected with the engine exhaust pipe 11. Thus a change of exhaust pressure determines a corresponding displacement of the sleeve 34 dependent upon the form of the slot 71.

The operation of the regulating device may be substantially as follows: assuming the control member 63 to be set at maximum power for continuous operation, that is, with the detent 64 engaging the notch 132, the control lever 16 in full open adjustment, and the power lever 22 set for the desired value of engine speed, then the valve 12, as shown in Figure 1, will be controlled by the hydraulic servo motor to maintain the engine manifold pressure at a certain value depending on engine operating conditions as will presently be pointed out. A variation of manifold pressure, for example a drop thereof, determines contraction of bellows 55 and displacement of the plunger valve 35 to the left, thus setting the piston 31 in motion to rotate the valve 12 clockwise, accelerate the speed of the compressor or supercharger 8 and increase the manifold pressure until the initial value thereof is restored, whereupon the bellows 55 resumes its initial position and returns the plunger valve 35 to neutral adjustment relative to the sleeve 34. If now the manifold temperature, or the cylinder temperature, or both vary, for instance increase, determining counter-clockwise rotation of the disc 51, then the lower end of the lever 48 and the plunger valve 35 will be displaced to the right, causing counter-clockwise rotation of the valve 12 to reduce the supercharger speed and decrease the manifold pressure until the bellows 55 has collapsed the necessary amount to bring the plunger valve 35 back to neutral position. A lower manifold pressure is thus obtained corresponding to the higher manifold and/or cylinder temperature; and the form of slot 51 may be so determined that the manifold pressure varies with the manifold temperature substantially as indicated, for instance, by the curve L of Figure 4. Similarly, either a variation of exhaust pressure causing expansion or contraction of bellows 74, axial displacement of the rod 72 and corresponding displacement of the upper end of the lever 65, or a change in the adjustment of the speed control lever 22 causing a corresponding displacement of the lower end of the same lever, produce an axial displacement of the sleeve 34 which sets the piston 31 in motion to vary the manifold pressure until bellows 55 has expanded or contracted to the extent of bringing the plunger valve 35 again to neutral adjustment relative to the sleeve 34 in the new position of the latter. It is therefore clear that the manifold pressure is caused to vary as a predetermined function of manifold temperature, cylinder or other engine operating temperature, exhaust pressure, engine speed, said function obviously depending upon or being determined by the form of the slots 50, 71 and 68, or by the cams or other equivalent devices which may be substituted for said slots.

As already stated, if the bellows 55 and 56 have different effective areas, and if the bellows 56 contains a substantial mass of gas or other expansible fluid, then the manifold pressure becomes also dependent upon the pressure and the temperature within the housing 30, which may be caused, for instance, to be substantially the same as the surrounding atmospheric air pressure and temperature.

The above automatic regulation occurs when the control lever 16 is in fully open adjustment, but at any time the pilot may rotate said lever clockwise for directly actuating the valve 12 to reduce the manifold pressure; and as long as the latter is below the maximum preselected value corresponding to automatic operation, the bellows 55 remains contracted, with the plunger valve 35 to the left of its neutral position and the piston 31 stationary in its extreme right position, the adjustment of the valve 12 being thus determined by the adjustment of the control lever 16. The regulating device however stands ready to resume control as the manifold pressure attains said maximum predetermined value. The same lever 16 may also be used to control the engine in the event of failure of the regulating device.

A displacement of control member 63, for example toward the left, determines contraction of the bellows 56 and compression of the spring 59. The increased spring load in turn contracts the bellows 55, causing clockwise rotation of the valve 12 and thereby increasing the manifold pressure until the bellows 55 expands, against the increased load of spring 59, the amount necessary to bring the plunger valve 35 back to neutral position. The regulating device will thus maintain higher manifold pressure, or higher engine indicated M. E. P., which may be represented in Figure 4 by a line substantially similar to the curve L but higher than the latter. In the example shown in Figure 1 the control member 63, which actuates the lever 60 by means of rod 62, is provided with four notches, 131 to 134, arranged to cooperate with the resilient detent 64. The adjustment illustrated, with the notch 132 engaged by the detent, may correspond to engine operation up to maximum manifold pressure (or maximum M. E. P.) for continuous operation. When the control member 63 is moved all the way to the left so as to engage the notch 134 with the detent, the regulator is set for maximum take-off power, which can safely be maintained only for very short time. The member 63 may be moved so as to engage the remaining notches 133 or 131; in the former case the regulator is set to permit temporary overload such as may be required for rapid climbing up to high altitude, while in the latter case cruising power operation may be obtained, corresponding to minimum fuel consumption. The foregoing assumes, of course, that the control lever 16 is in fully open adjustment, and that the speed control lever 22 is suitably set to obtain just the power output actually desired. That is to say, for a given adjustment of the control member 63 the actual engine power output may be controlled by varying the setting of the power lever 22 from the minimum values of engine speed and manifold pressure up to the limit of engine power determined by the actual setting of the member 63. It will be clear from the foregoing that this lever 22 has a double function: it controls, through the lever 20 of the governor, the engine speed, and it also controls, by means of the slot connection 68 and depending structure, the engine manifold pressure or M. E. P. It controls, that is, the two factors of engine power output, according to a schedule which is determined primarily by the configuration of the slot 68; and such basic or approximate schedule or relationship between engine speed and manifold pressure, or engine speed and fuel flow, may be modified by altering the setting of the manual member 63, and may further be varied automatically by means of the various compensating elements already described, which actuate the sleeve 34 or the plunger valve 35 upon changes of various operating conditions such as temperature, atmospheric or entering air density or pressure, exhaust pressure, etc.

As a result, the engine regulator will automatically so regulate and coordinate the fuel flow and the propeller blade angle as to permit full utilization of the permissible engine power safely obtainable under each set of operating conditions, while protecting the same against operation beyond its safe limits. Moreover, the various parts of the mechanism may be so designed as to obtain automatically various and different results under different selected conditions. Thus, when the control member 63 is set for cruising power, the portions of the connections between the various elements of the regulating device, such as the slots 50, 71 and 68, which are effective during cruising operation, may be so designed as to coordinate engine speed and manifold pressure to obtain maximum fuel economy. On the other hand, when the control member 63 is set, for instance, for take-off power, the various portions of the slots and other connections then effective will preferably be designed to obtain maximum performance irrespective of fuel consumption.

The three manual control elements 63, 16 and 22 may be variously combined or interconnected to be operated by a single member, and timing devices may be provided in connection with member 63 to shift the latter away from take-off or temporary overload adjustments after it has remained a predetermined time in said position.

Fuels of higher antiknock rating have corresponding curves of maximum power for continuous output which are higher than the line L of Figure 4 and often have smaller slope at high manifold temperature. The regulating device of Figure 1 may be adjusted for such fuels by suitably adjusting the element or screw 61, the element 75, or both.

It is to be clearly understood that the invention may be applied to any suitable type of engine having any known type of supercharger or compressor, however driven, and to any type of throttle controlled engine, the latter case being illustrated in Figures 2 and 3. Referring now particularly to Figure 2, in which reference numerals already used in Figure 1 designate similar parts, the engine 80 is controlled by means of a conventional throttle valve connected with lever 81 actuated by the regulating device 82 through the rod 19. The lever 81 of Figure 2 is equivalent to the lever 14 of Figure 1 in that clockwise or counter-clockwise rotation thereof determines an increase or a decrease of the engine manifold pressure, respectively. One temperature responsive element 83 may be provided to actuate the lever 52, such element being preferably, although not necessarily, so arranged as to be responsive not only to the temperature of the air or combustible mixture in the manifold 9, but also, to a predetermined extent, to the temperature of the surrounding parts of the engine cylinder 7. The regulating devices 82 and 29 are similar with the exception that bellows 74 has been eliminated from the former, the upper end of lever 65 thereof being pivoted on the shaft 84 carried by the housing. Moreover in the regulator 82 the bellows 56 has a smaller effective area than the bellows 55, and means such as a vent 136 is provided for keeping the pressure within the housing 30 substantially equal to the surrounding pressure and in turn to the engine exhaust back-pressure, as the exhaust ports of the engine 80 are substantially open to the atmosphere. The manifold pressure of this engine may thus be automatically regulated, or the maximum value thereof may be limited, substantially as a predetermined function of the manifold and engine cylinder or other operating temperatures, surrounding atmospheric pressure and engine speed, said function depending upon the adjustment of the control member connected with the link or rod 62.

It has already been pointed out that with the regulator described in connection with Figure 1 when the pilot desires to vary the thrust of the powerplant and moves the power control lever 22, he alters the speed setting of the propeller governor lever 20 and simultaneously, through the slot connection 68, varies the adjustment of the sleeve 34 thus changing the pressure setting of the regulator; and it will be clear that any desired basic coordination or schedule between the resulting variations of engine speed and manifold pressure may be obtained by suitably designing the slot 68. If however it is not desired that the manifold pressure vary with the engine speed, then the regulator may be simplified by eliminating the operative connection between the control member 22 actuating the rod 66 and the sleeve 34. Accordingly, Figure 6 shows a modification of Figure 1 or Figure 3, in which the lower end of the lever 65, instead of being operatively connected by way of linkage 66 with the control member 22, is pivoted to the housing.

While in the embodiment disclosed in connection with Figures 1 and 2 the regulating device is so arranged as to regulate the manifold pressure, it will be apparent to those skilled in the art that various other arrangements may be utilized without in any way exceeding the scope of the invention. For example, since the torque and the manifold pressure are mutually dependent variables, devices substantially similar to those already described may be arranged to regulate the engine power by controlling engine speed and torque according to a predetermined schedule and as a preselected function of one or more operating conditions. One such arrangement is illustrated in Figure 3, in which the engine 86 is provided as usual with means for controlling the fuel flow, such as a throttle valve actuated by a lever 81. Rotation of this valve will of course determine concomitant variations in a number of interrelated conditions such as engine fuel supply, manifold pressure, engine torque, power output. A torque meter 87 is provided, such as a hydraulic torque responsive device connected with a planetary speed reduction gear arranged between the engine crankshaft and the propeller shaft, for maintaining the oil pressure in suitable conduit and reservoir means or pressure line 88 at all times proportional to the torque transmitted from the engine to the propeller. A torque meter of this type is diagrammatically indicated in Figure 5, showing a section through the nose of the engine of Figure 3 perpendicular to the shaft thereof, wherein 115 indicates the engine nose housing containing a reduction gear of the planetary type having planet pinions 116 carried by journals 117 supported by an annular member, not shown, rotatable with the propeller shaft 118 and engaged between a sun gear 119 secured to the engine crankshaft and an outer ring gear 120. The latter is connected by way of rod 121 with a piston 122. An engine driven pump 123 discharges oil under pressure into chamber 124 on the outer side of the piston 122 for applying to said piston a load balancing the tangential load, proportional to the propeller torque, transmitted by the outer ring gear 120 to the rod 121. Oil escapes from the chamber 124 to the low pressure chamber 125 by way of a duct 126 and a restricted passage of variable effective area 127 between the cover 87 and the piston 122, whereby the effective area decreases or increases upon a displacement of the piston 122 to the left or right, respectively. The torque transmitted through the reduction gear tends to rotate the outer ring gear 120 counter-clockwise and displace the piston 122 toward the left, and is normally balanced by the oil pressure in the chamber 124. An incease of torque causes displacement of the piston 122 toward the left thereby reducing the effective area of the restricted passage 127 and increasing the oil pressure in the chamber 124 in proportion to the increase of torque, whereupon the equilibrium of the piston 122 is reestablished.

The engine regulating device 90 includes a pressure responsive element such as a bellows 91 connected by means of a pressure line 88 with the pressure chamber 124 of the torque meter so that the pressure within the bellows is proportional to the engine torque. A member 54, connected with the upper end of lever 48, is arranged between the movable wall of bellows 91, to which it is secured, and a spring 92 adjustable by way of the rod 62. The pressure within the housing closed by cover 76 is maintained at surrounding atmospheric pressure by means of a vent 93. The arrangement of regulator 90 and the operative connections thereof may otherwise be similar to those already disclosed, as is indicated in part by the reference numerals, and it will therefore be apparent that the regulator will adjust the engine torque, or limit the maximum value thereof, as a preselected function of the induction air and cylinder temperatures, surrounding atmospheric pressure, and engine speed, said function being dependent on the adjustment of the rod 62 which is actuated by means of the member 63.

It is clear from the foregoing that the actual operation of the regulator may be initiated and governed by any of the various condition-responsive elements, the control of the engine shifting automatically from one regime to another so as to regulate whichever condition happens to be most critical under the existing set of operating conditions. For example, the regulating device of Figure 3 may be so designed that when the engine operating temperatures are well within safe limits, the engine fuel supply is so regulated as to maintain whichever value of torque has been selected by the pilot through the setting of the condition member 63—62 and the power lever 22, the basic regulating element being then the torque sensing bellows 91. If however the engine operating temperature increases and approaches or attains certain predetermined safe limits, then the temperature sensing element 83 takes over and decreases the engine fuel flow and consequently the torque and the power output so as to protect the engine against operation outside its safe limits of temperature. But as soon as the conditions which brought about the higher engine temperatures subside and the element 83 senses a drop in temperature, the basic regulation of fuel flow reverts automatically to the torque sensing bellows 91 to reestablish the full values of torque and power corresponding to the setting of the pilot's controls. Of course, similar automatic shifts from one regime to another also take place in the controls disclosed in connection with Figures 1 and 2, for the purpose and with the effect of securing automatically full utilization of the permissible power safely obtainable under each operating condition, while protecting the powerplant against operation outside its safe ratings.

While particular mechanical embodiments have been somewhat diagrammatically illustrated for the purpose of disclosing the invention, it is to be understood that the invention is not limited to the arrangements so specifically illustrated and described. And while in the specific arrangements disclosed as examples of embodiment of the invention the regulating devices control the engine fuel supply by actuating the waste gate of a turbo-supercharger as in Figure 1, or the throttle valve as in Figures 2 and 3, it will be readily understood that the regulating devices according to the invention may be used in connection with other types of engines having different means for variably regulating the engine fuel supply or fuel flow. Moreover, it is to be expressly understood that the invention may be used in various ways, and that modifications, substitutions, additions and omissions may be resorted to in the character, construction, arrangement, manner of operation and number of the various elements and parts within the limits or scope of the invention as defined in the appended claims.

In interpreting said claims, where they are directed to less than all of the elements of the complete system disclosed, they are to be construed as covering possible use of the recited elements in installations which lack the non-recited elements.

Certain features disclosed herein are claimed in my copending application Serial No. 423,001 filed December 15, 1941, now abandoned.

What I claim is:

1. Apparatus for controlling the power output of an internal combustion engine comprising an adjustable control member, means operated by the control member for selecting different manifold pressures, automatic means for maintaining whatever pressure is selected, means also operated by the control member to variably regulate the engine speed in order to maintain a definite power output schedule, and means for varying such schedule by changing the position of the pressure selecting means so as to cause a different manifold pressure to be maintained, said last named means being operable independently of the control member and of the speed regulating means.

2. Apparatus for controlling the power output of an internal combustion engine comprising an adjustable control member, means operated by the control member for selecting different manifold pressures, automatic means for maintaining whatever pressure is selected, means also operated by the control member to variably regulate the engine speed in order to maintain a definite power output schedule, and means for varying such schedule by changing the position of the pressure selecting means so as to cause a different manifold pressure to be maintained, without changing the setting of either the control member or the means for regulating engine speed.

3. Apparatus for controlling the power output of an internal combustion engine comprising an adjustable control member, an element positioned by the control member for selecting different manifold pressures to be maintained, means for automatically maintaining whatever pressure is selected by said element, a second element positioned by the control member for variably regulating engine speed, said elements being set in position by the control member to maintain some desired definite power output schedule and means for modifying such power output schedule by changing the position of the pressure selecting element so as to cause a different manifold pressure to be obtained without changing the setting of the control member or said second element.

4. Apparatus for controlling the power output of a supercharged internal combustion engine comprising, in combination, a manually operated control member, an element operable thereby for selecting different manifold pressures, automatic means for maintaining any selected pressure, a second element operable by the control member to regulate engine speed, said first and second elements being positioned by the control member to control the power output of the engine according to some predetermined schedule, and a second control means operable during operation of the engine and independently of said manually operable member and speed regulating element for changing the position of the pressure selecting element in order to effect a change in the power output.

5. Apparatus for controlling the power output of a supercharged internal combustion engine comprising a manually operated member, means adjusted thereby for controlling the engine speed and fuel intake pressure factors of power output according to a predetermined schedule and means operable while the manually operated member remains in a set position for effecting a decrease in value of one of the power output factors below the normal schedule.

6. Apparatus for controlling the power output of a supercharged internal combustion engine comprising a manually operated member, means adjusted thereby for controlling the engine speed and fuel intake pressure factors of power output according to a predetermined schedule and means operable while the manually operated member remains in a set position for effecting a decrease in the pressure factor while the engine speed factor remains as set by the manually operable member.

7. Apparatus for controlling the power output of a supercharged internal combustion engine comprising, in combination, a manually adjustable lever movable to different positions to control engine speed and pressure, a member operated thereby for selecting a pressure to be maintained in the fuel induction passage, means for maintaining the pressure selected, means also operated by said lever for controlling the engine speed so that the lever is effective to regulate the power output of the engine according to a predetermined schedule, and means operable while the manually operable lever and speed controlling means remain set in an adjusted position for moving the pressure selecting member to effect either an increase or decrease in pressure selection so as to vary the normal power schedule.

8. Control system for aircraft engine driving a variable pitch propeller, comprising in combination, a speed control including an engine driven governor for adjusting the propeller pitch to hold the engine speed at a selected value; a fuel control having valve means for controlling the rate of fuel supply to the engine and including first temperature responsive means for varying the rate of fuel supply in predetermined relation to the surrounding ambient temperature and second temperature responsive means sensing variations in an engine temperature resulting from combustion for restricting the engine fuel supply to limit said engine temperature; and a pilot's control operatively connected to said speed and fuel controls to vary the engine speed and the limit of said engine temperature according to a predetermined schedule.

9. Control system for a powerplant driving a shaft subject to adjustable load, comprising in combination, a speed control including adjustable governing means for regulating said shaft load to hold the shaft speed constant at a selected value; a fuel control having valve means for regulating the rate of fuel supply to the powerplant including first temperature responsive means for varying the rate of fuel supply as a predetermined function of the surrounding air temperature, and second temperature responsive means sensing variations in a temperature of the powerplant dependent upon the rate of fuel supply for restricting said fuel supply to control the powerplant temperature; a control member operatively connected to change the settings of said speed and fuel controls for selecting both the shaft speed and the maximum value of said powerplant temperature; and means operatively connected with said fuel control for varying said powerplant temperature without changing the shaft speed.

10. Apparatus for controlling the power output of an engine comprising an adjustable control member, means operated by the control member for selecting different fuel flows, automatic means for maintaining the selected fuel flow, means also operated by the control member to variably regulate the engine speed in order to maintain a definite power output schedule, first temperature responsive means sensing variations of surrounding air temperature for varying such schedule by altering the effect of the fuel flow selecting means so as to cause a different flow to be maintained, and second temperature responsive means sensing variations of engine temperature resulting from combustion for decreasing the fuel flow when said engine temperature becomes excessive.

11. Apparatus for controlling the power output of an engine, comprising a manually operated member, means controlled thereby for controlling the engine speed and the fuel supply factors of power output according to a predetermined schedule, means responsive to variations of ambient air pressure and temperature operable to effect a variation in said fuel supply while the manually operated member remains in a set position, and means sensing variations in engine combustion temperature operable to limit said engine temperature automatically by restricting said fuel supply.

12. A control system for a power plant comprising first regulating means including speed responsive means connected with the power plant for controlling power plant speed; second regulating means including means sensing variations of power plant temperature resulting from combustion for adjusting the fuel flow to control said power plant temperature; a control member adjusting both said first and second regulating means to produce a predetermined schedule of power plant speed and temperature as a function of the position of said control member; and means for varying such schedule by altering the operation of the second regulating means so as to cause a different power plant temperature to be maintained, said last named means being operable independently of the control member and of the first regulating means.

13. In a power plant, first regulating means for controlling power plant speed, second regulating means for regulating fuel flow including a device responsive to a temperature of the power plant varying with the flow of fuel for restricting said flow upon rising temperature to control the maximum value of said power plant temperature, first control means for adjusting said first and second regulating means to vary speed and maximum temperature according to a preselected schedule as a function of the position of said first control means, and additional control means operatively connected with said temperature responsive device for altering the setting thereof to vary said schedule.

14. A control system for an aircraft powerplant driving a variable pitch propeller, including in combination, an adjustable governor driven by the powerplant for varying the propeller pitch to control the powerplant speed; an adjustable fuel control device for regulating the rate of fuel supply to the powerplant; a pilot's control lever; an operative connection for adjusting said governor from said pilot's lever and an operative connection for adjusting said fuel control device from the same pilot's lever; air pressure and temperature responsive means connected with said fuel control device for varying the rate of fuel supply in response to variations of surrounding ambient temperature and air pressure; temperature responsive means arranged to sense variations of an operating temperature of the powerplant resulting from combustion and connected with said fuel control device for restricting the rate of fuel flow to limit said powerplant temperature; and additional control means operable independently of said pilot's lever for varying the datum of said powerplant temperature responsive means.

15. A control system for a power plant comprising first regulating means including speed responsive means connected with the power plant for controlling power plant speed; second regulating means including means responsive to changes of surrounding air pressure and means sensing variations of power plant temperature resulting from combustion for adjusting the fuel flow to control said power plant temperature; a control member adjusting both said first and second regulating means to produce a predetermined schedule of power plant speed and temperature as a function of the position of said control member; and means for varying such schedule by altering the operation of the second regulating means to cause a different power plant temperature to be maintained, said last named means being operable independently of the control member and of the first regulating means.

16. For use with an aircraft engine driving a variable pitch propeller, a control apparatus for controlling the power output of the engine by selectively varying the rate of engine fuel supply and the propeller pitch, said control apparatus comprising in combination, a power control member; a propeller governor controlled by said control member for adjusting the propeller pitch to control the engine speed; and a fuel control adjusted by said power control member for controlling the rate of engine fuel supply, including air pressure and temperature responsive means actuated in response to variations of surrounding barometric pressure and air temperature to effect variations in the rate of engine fuel supply while the power control member remains in a set position, and temperature responsive means sensing variations in an operating temperature of the engine resulting from combustion and varying as a function of engine fuel supply operable to limit said engine temperature automatically by reducing said rate of fuel supply upon increase of said engine temperature.

17. Apparatus for controlling the power output of an engine, comprising a manually operable control member, speed control means adjusted by said control member for controlling the speed factor of power output and fuel control means adjusted by the same control member for controlling the fuel supply factor of power output according to a predetermined schedule, said fuel control means including valve means movable to increase or decrease said fuel supply, pressure and temperature responsive means actuated upon variations of ambient air pressure and temperature for effecting movement of said valve means to vary said fuel supply while the manually operable control member remains in a set position, and temperature responsive means sensing variations in an operating temperature of the engine resulting from combustion for limiting said engine temperature by effecting movement of said valve means to restrict said fuel supply.

18. Apparatus for controlling the power output of an engine comprising an adjustable control member, means operated by the control member for selecting different fuel flows, automatic means for maintaining the selected fuel flow, means also operated by the control member to variably regulate the engine speed in order to maintain a definite power output schedule, first temperature responsive means actuated in response to variations of surrounding air temperature for varying such schedule by altering the effect of the fuel flow selecting means so as to cause a different flow to be maintained, second temperature responsive means sensing variations of engine temperature resulting from combustion for decreasing the fuel flow when said engine temperature exceeds a predetermined limit, and additional control means operable to vary the setting of said second temperature responsive means for altering said engine temperature limit.

19. In a power plant, first regulating means for controlling power plant speed, second regulating means for regulating fuel flow including a device responsive to a temperature of the power plant varying with the flow of fuel for restricting said flow upon rising temperature to control said power plant temperature, first control means for adjusting said first and second regulating means to regulate said speed and temperature according to a preselected schedule as a function of the position of said first control means, and additional control means including ambient air pressure responsive means operatively connected with said temperature responsive device for altering the setting thereof to vary said schedule.

20. In a power plant, first regulating means for controlling power plant speed, second regulating means for regulating fuel flow including a device responsive to a temperature of the power plant varying with the flow of fuel for restricting said flow upon rising temperature to control the power plant temperature, first control means for adjusting said first and second regulating means to control the power plant speed and temperature according to a preselected schedule as a function of the position of said first control means, and additional control means including a device responsive to variations of ambient temperature operatively connected with said power plant temperature responsive device for altering the setting thereof to vary said power plant temperature.

21. In a power plant, first regulating means for controlling power plant speed, second regulating means for regulating fuel flow including a device responsive to changes of a temperature of the power plant varying with the flow of fuel for restricting said flow upon rising temperature to control said power plant temperature, first control means for adjusting said first and second regulating means to control said speed and power plant temperature according to a preselected schedule as a function of the position of said first control means, and additional control means operatively connected with said second regulating means for altering the fuel flow to vary the maximum power output obtainable by said first control means.

References Cited in the file of this patent

UNITED STATES PATENTS

| | | |
|---|---|---|
| Re. 22,661 | Gosslau et al. | Aug. 7, 1945 |
| 2,088,954 | Gregg | Aug. 3, 1937 |
| 2,217,364 | Halford et al. | Oct. 8, 1940 |
| 2,283,175 | Berger | May 19, 1942 |
| 2,306,953 | Jung | Dec. 29, 1942 |
| 2,322,303 | Martin | June 22, 1943 |
| 2,336,844 | Buch | Dec. 14, 1943 |
| 2,396,618 | Stieglitz | Mar. 12, 1946 |
| 2,403,398 | Reggio | July 2, 1946 |

FOREIGN PATENTS

| | | |
|---|---|---|
| 458,350 | Great Britain | Dec. 17, 1936 |